United States Patent [19]

Dünweg et al.

[11] Patent Number: 5,403,485
[45] Date of Patent: Apr. 4, 1995

[54] DIALYSIS MEMBRANE MADE OF CELLULOSE ACETATE

[75] Inventors: Gustav Dünweg, Wuppertal; Lother Steinfeld, Schwelm; Wolfgang Ansorge, Essen, all of Germany

[73] Assignee: Akzo N.V., Arnhem, Netherlands

[21] Appl. No.: 63,321

[22] Filed: May 19, 1993

[30] Foreign Application Priority Data

May 20, 1992 [DE] Germany .............. 42 16 660.8

[51] Int. Cl.⁶ ............................................. B01D 33/21
[52] U.S. Cl. ........................... 210/500.23; 210/500.29; 210/500.3; 210/500.31; 210/500.32; 264/199; 264/561; 264/200; 428/298
[58] Field of Search ............ 210/500.23, 500.31, 210/500.29, 500.3, 500.32; 264/199, 561, 200; 428/398

[56] References Cited

U.S. PATENT DOCUMENTS

| | | |
|---|---|---|
| 3,546,209 | 12/1970 | Lipps . |
| 3,888,771 | 6/1975 | Isuge et al. .............. 264/199 |
| 4,035,459 | 7/1977 | Kesting et al. ............ 210/500.3 |
| 4,234,431 | 11/1980 | Mishiro et al. ............ 264/200 |
| 4,276,173 | 1/1981 | Kell et al. ................ 264/200 |
| 4,342,711 | 8/1982 | Joh et al. ................ 264/200 |
| 4,385,094 | 5/1983 | Tanaka et al. ............ 428/398 |
| 4,444,716 | 4/1984 | Aoyagi et al. ............ 264/561 |
| 4,535,028 | 8/1985 | Yokogi et al. . |
| 4,543,221 | 9/1985 | Chen et al. ............... 264/200 |
| 4,741,927 | 5/1988 | Pelger et al. ............. 210/500.29 |
| 4,772,393 | 9/1988 | Pelger et al. ............. 210/500.29 |
| 4,822,540 | 4/1989 | Manabe et al. ............ 210/500.29 |
| 4,834,882 | 5/1989 | Kataoka et al. . |
| 4,919,809 | 4/1990 | Yamamoto et al. ........ 210/500.29 |
| 4,925,534 | 5/1990 | Kataoka et al. . |
| 5,084,349 | 1/1992 | Sasaki et al. ............ 210/500.21 |
| 5,192,440 | 3/1993 | von Sengbusch . |

FOREIGN PATENT DOCUMENTS

| | | |
|---|---|---|
| 0076442 | 4/1983 | European Pat. Off. . |
| 249189 | 12/1987 | European Pat. Off. . |
| 2059048 | 6/1972 | Germany . |
| 2606244 | 8/1976 | Germany . |
| 2619250 | 11/1976 | Germany . |
| 3016542 | 11/1980 | Germany . |
| 3220041 | 3/1983 | Germany . |
| 3438531 | 4/1986 | Germany . |
| 381237 | 9/1986 | Germany . |
| 54-27025 | 3/1979 | Japan . |
| 54-55623 | 5/1979 | Japan . |
| 203517A | 6/1980 | United Kingdom . |
| 2069925 | 9/1981 | United Kingdom . |

Primary Examiner—Robert A. Dawson
Assistant Examiner—Ana M. Fortuna
Attorney, Agent, or Firm—Oliff & Berridge

[57] ABSTRACT

A dialysis membrane in the form of a hollow fiber with a continuous internal cavity is made of cellulose acetate or a cellulose acetate derivative. The hollow fiber is made by using a gas to form the internal hollow cavity. A dialysis membrane in the form of a hollow fiber with a continuous hollow cavity may be made in a process using a spinning solution containing an organic carboxylic acid. Modification agents can be added to the solution and the solution extruded through a spinneret suitable for manufacturing hollow fibers, while an internal medium is introduced simultaneously into the internal cavity of the forming hollow fiber. The precipitation of the dialysis membrane thus formed and an ordinary further aftertreatment take place subsequently in a precipitation bath. The hollow fiber is made by using a gas as the internal medium to form the internal cavity.

19 Claims, No Drawings

DIALYSIS MEMBRANE MADE OF CELLULOSE ACETATE

FIELD OF THE INVENTION

The invention relates to a dialysis membrane in the form of a hollow fiber with a continuous interior cavity, made of cellulose acetate or a cellulose acetate derivative, as well as a process for manufacturing this dialysis membrane.

BACKGROUND OF THE INVENTION

Membranes made of cellulose acetate have been known for a long time. They exist in the form of flat membranes, tubular membranes, and hollow fiber membranes.

Thus, for example, DE-OS 20 59 048 describes a process for manufacturing a dry, semipermeable cellulose acetate membrane, composed of an active separating layer and a porous supporting layer. The membrane is dipped into an aqueous solution, containing in addition to a polyvalent alcohol with 2 or 3 carbon atoms in the molecule, at least one other substance, with the latter then being dried. The membrane is immersed in an aqueous solution containing as the other substance, 2 to 20 wt. % of an organic carboxylic acid with 1 to 3 carbon atoms in the molecule and 20 to 40 wt. % of the polyvalent alcohol with 2 to 3 carbon atoms in the molecule, and then being dried at a temperature between room temperature and 100° C. The goal of this invention was to provide a membrane in which a treatment prior to drying prevents the separating action of the membrane not being adversely affected by drying.

DE-OS 26 19 250 describes a membrane one of whose surfaces is made by the dry phase inversion process while the other surface is made by the wet phase inversion process. These membranes are made by extruding a spinning solution containing a polymer in the form of a hollow fiber into an evaporation-promoting gaseous phase and injecting a nonsolvent for the polymer into the interior cavity of the hollow fiber, so that the exterior of the hollow fiber membrane is formed by the dry phase inversion process and the interior is formed by the wet phase inversion process. The result is dry-spun asymmetric hollow fibers.

DE-OS 26 06 244 describes a hollow fiber for membrane filtration consisting of a synthetic or semi-synthetic chain polymer that forms fibers during spinning and is characterized by its netlike structure. The hollow fiber is produced in the usual fashion by extruding the spinning solution through a spinneret, with a core-forming liquid for forming the interior cavity simultaneously being placed in the middle of the forming hollow fiber. The hollow fiber is spun downward with a fixed air gap.

In order to avoid the known problems that arise when using cavity-forming liquids during the manufacture of hollow fiber membranes, a variety of proposals have been made to use a gas instead of a liquid as the cavity-forming substance.

Thus, for example, EP 0 076 442 describes a hollow fiber made of regenerated copper ammonium cellulose, having a cylindrical bore on the lengthwise axis for the entire length of the fiber, with the length of the fiber being at least 10 m and the bore being filled with a gas.

This hollow fiber is obtained by extruding a spinning solution through an annular slot nozzle, with a gas being simultaneously introduced into the interior as it forms, and with the fiber being allowed to fall in free fall through an air gap and then dipping for a depth of up to 30 mm into a coagulation bath. Spinning solutions with high to very high viscosity are required for this purpose and are of course very difficult to handle.

According to the Derwent abstract of Japanese Application J 54027-025, hollow fiber membranes composed of polyvinyl alcohol are obtained when a spinning solution containing polyvinyl alcohol is spun through an annular slit opening, with a gas simultaneously being introduced into the interior cavity as it forms, in order to allow this internal cavity to coagulate. The coagulating gas can be ammonia or acetone vapor.

According to the Derwent abstract of Japanese Patent Application J 54055-623, hollow fiber membranes are obtained from acrylonitrile in which a spinning solution containing at least 50 wt. % acrylonitrile is spun through a nozzle and an inert gas or air is added simultaneously through the nozzle to form the interior cavity. The resultant membrane has a skin on its interior that is less than 0.5 $\mu$m thick.

The above-mentioned membranes are only conditionally suitable for dialysis. In particular, these membranes leave much to be desired as far as their biocompatibility is concerned.

Membranes suitable for dialysis should be maximally biocompatible. A number of conditions must be met for this to be the case.

Substances that influence the biocompatibility of a membrane include albumin and $\beta$2-microglobulin. $\beta$2-microglobulin (molecular weight approximately 11,800) is loosely bonded to the surfaces of all cells containing nuclei as part of the main histocompatibility complex. This complex is responsible among other things for the compatibility of foreign tissue with the body's own tissue.

$\beta$2-microglobulin is decomposed exclusively in the kidney and the daily production rate in a healthy individual is about 150 mg. Dialysis patients and uremics on the other hand have much higher $\beta$2-microglobulin serum levels than healthy individuals. It is therefore very important for the $\beta$2-microglobulin to be removed effectively during treatment.

The albumins likewise belong to the group of serum proteins, and constitute the largest group. The albumins maintain the colloidosmotic pressure and transport the body's own low-molecular substances as well as foreign ones. They also constitute the protein reservoir of the body.

Since the number of albumins is generally reduced in dialysis patients, it is important to ensure during treatment that albumin loss is kept as low as possible.

Depending on the area of application, a membrane must exhibit equally good performance parameters at different ultrafiltration rates, for example sieving coefficient.

In the past, however, it was usual for membranes that the corresponding screen coefficient for $\beta$2-microglobulin and albumin at high ultrafiltration rates (high-flux range) did not reach these figures at average ultrafiltration rates (middle-flux range) or at low to very low ultrafiltration rates (low-flux range).

A membrane that functioned well in the low-flux range for example showed a sharp drop in terms of its separating effect in the high-flux range.

SUMMARY OF THE INVENTION

A goal of the invention, therefore, is to provide a membrane that exhibits low albumin loss over a wide range of ultrafiltration rates. The membrane must also exhibit high permeability to β2-microglobulin in all ranges. This and other goals are achieved by a membrane of the species recited at the outset, characterized by the hollow fiber being produced using a gas to form the internal cavity.

DETAILED DESCRIPTION OF PREFERRED EMBODIMENTS

In an embodiment of the invention, the gas can contain solid particles and/or liquid particles.

Preferably the dialysis membrane has an ultrafiltration rate of 2 to 200 ml/m²·h·mm Hg and a maximum sieving coefficient of 0.1 for albumin with a molecular weight of 68,000.

The dialysis membrane is also characterized by having a sieving coefficient of more than 0.5 for β2-microglobulin with a molecular weight of 11,800.

Preferably, the dialysis membrane is composed of cellulose acetate with an average acetylation degree of 2.0 to 3.0 and preferably 2.4 to 2.6.

The term "average acetylation degree" refers to the average number of OH groups substituted per cellulose molecule.

The above goal is also achieved by a process for manufacturing such a dialysis membrane in the form of a hollow fiber with a continuous internal cavity, with a spinning solution containing an organic carboxylic acid, possibly with the addition of modification agents, being extruded through a spinneret suitable for the manufacture of hollow fibers, whereby an internal medium is simultaneously introduced into the interior cavity of the hollow fiber as it is formed, and whereby the precipitation of the resultant dialysis membrane takes place in a precipitation bath followed by normal additional aftertreatment, characterized by the hollow fiber being produced by employing a gas as the internal medium to form the internal cavity.

In an embodiment of the invention, the gas can contain solid particles and/or liquid particles.

Preferably, the precipitation bath is kept at a temperature between 5° and 50° C., especially preferably between 5° and 15° C.

According to a preferred embodiment of the invention, the extruded spinning solution is guided over a distance of at least 50 cm through the precipitation bath before the initial deflection of the hollow fiber formed.

Preferably the spinning solution contains in addition a modification agent, such as glycerin, polyethylene glycol, polypropylene glycol, polyvinyl pyrrolidone, or mixed polymers of ethylene oxide and propylene oxide.

Preferably, acetic acid is used as the organic carboxylic acid in the spinning solution.

Preferably, the spinning solution contains 9 to 30 wt. % cellulose acetate, 60 to 91 wt. % acetic acid, and possibly a modification agent and/or water.

In an embodiment of the invention, the spinning solution contains 5 to 20 wt. % modification agent.

In another embodiment of the invention, the spinning solution contains 5 to 20 wt. % water.

The process according to the invention produces especially good results when the spinning solution contains 10 to 20 wt. % cellulose acetate, 60 to 70 wt. % acetic acid, 5 to 15 wt. % modification agent, and 5 to 15 wt. % water.

Preferably the precipitation bath is a dilute acetic acid.

Preferably the acetic acid in the precipitation bath is kept at a concentration between 1 and 20 wt. %.

It has likewise been found to be advantageous for the process for the spinneret to be immersed in the precipitation bath and for the hollow fiber to be spun upward.

Embodiments of the invention will be described in greater detail with reference to the following example.

EXAMPLE 1

A spinning solution with a composition of 16.0 wt. % cellulose diacetate, 68.0 wt. % acetic acid with a concentration of 99.9%, 8.0 wt. % water, and 8.0 wt. % polyethylene glycol 400 was extruded through an annular slit nozzle with a width of 0.045 mm and an outside diameter of 0.43 mm, with nitrogen gas simultaneously being introduced into the outlet opening of the spinneret at a pressure of 73 mbar. The spinneret is arranged so that its outlet opening points vertically upward and the distance between the nozzle outlet opening and the bath surface was 70 cm.

The precipitation bath contains 65 g acetic acid per liter of demineralized water, and the temperature of the precipitation bath is 15°. At a spinning rate of 16 m/min, the residence time of the forming hollow fiber in the precipitation bath is 2.6 seconds. After leaving the precipitation bath, the hollow fiber is rinsed in demineralized water at 35° C. to remove solvents and accompanying materials and treated with glycerin at the end of the line.

Drying takes place continuously in a drum drier with a surface temperature between 50° to 65° C. The finished hollow fibers are wound up on cross-bobbins. The cross section of the hollow fiber is circular everywhere in the lengthwise direction and measures a constant 218 μ, while the wall thickness is a constant 24 μ. Test bodies made from these hollow fibers exhibit the following performance data:

Ultrafiltration rate: 167 ml/m²·h·mm Hg
Dialysis capacity for vitamin B12: 16.1 cm/min·10$^{-3}$
Dialysis capacity for creatinine: 48.5 cm/min·10$^{-3}$
Sieving coefficient for albumin: 0.046
Sieving coefficient for β2-microglobulin: 0.65 (measured as cytochrome C)

What is claimed is:

1. Dialysis membrane in the form of a hollow fiber with a continuous internal cavity, comprising cellulose acetate or a cellulose acetate derivative, wherein the hollow fiber is made by using a gas to form the internal cavity, and wherein the membrane is substantially permeable to β2-microglobulin and substantially less permeable to albumin, wherein the cellulose acetate and cellulose acetate derivative both have an average acetylation degree between 2.0 to 3.0.

2. Dialysis membrane according to claim 1, having an ultrafiltration rate of 2 to 200 ml/m²·h·mm Hg and a maximum sieving coefficient of 0.1 for albumin with a molecular weight of 68,000.

3. Dialysis membrane according to claim 1, having a sieving coefficient of more than 0.5 for β2-microglobulin with a molecular weight of 11,800.

4. Dialysis membrane according to claim 1, wherein the cellulose acetate has an average acetylation degree of 2.4 to 2.6.

5. Process for manufacturing the dialysis membrane according to claim 1 comprising:
    extruding a spinning solution containing an organic carboxylic acid through a spinneret suitable for manufacturing hollow fibers;
    simultaneously introducing a gas internal medium into the internal cavity of the forming hollow fiber;
    precipitating the dialysis membrane thus formed; and
    post-treating the membrane in a precipitation bath.

6. Process according to claim 5, wherein at least one modification agent is added to the spinning solution.

7. Process according to claim 6, wherein the modification agent is at least one member of the group consisting of glycerin, polyethylene glycol, polypropylene glycol, mixed polymers of ethylene oxide and propylene oxide; and polyvinyl pyrrolidone.

8. Process according to claim 6, wherein the spinning solution contains 5 to 20 wt. % modification agent.

9. Process according to claim 6, wherein the spinning solution contains 5 to 20 wt. % water.

10. Process according to claim 6, wherein the spinning solution contains 10 to 20 wt. % cellulose acetate, 60 to 70 wt. % acetic acid, 5 to 15 wt. % modification agent, and 5 to 15 wt. % water.

11. Process according to claim 5, wherein the precipitation bath is kept at a temperature between 5° and 60° C.

12. Process according to claim 11, wherein the precipitation bath is kept at a temperature between 5° and 15° C.

13. Process according to claim 5, further comprising guiding the extruded spinning solution over a distance of at least 50 cm through the precipitation bath and further deflecting the hollow fiber formed.

14. Process according to claim 5, wherein the organic carboxylic acid is acetic acid.

15. Process according to claim 5, wherein the spinning solution contains 9 to 30 wt. % cellulose acetate and 60 to 91 wt. % acetic acid.

16. Process according to claim 15, wherein the solution further contains a member of the group consisting of a modification agent, water and mixtures thereof.

17. Process according to claim 5, wherein the precipitation bath is a dilute acetic acid.

18. Process according to claim 17, wherein the acetic acid in the precipitation bath is kept at a concentration between 1 and 20 wt. %.

19. Process according to claim 5, wherein the spinneret is immersed in the precipitation bath and the hollow fiber is spun upward.

\* \* \* \* \*

UNITED STATES PATENT AND TRADEMARK OFFICE
CERTIFICATE OF CORRECTION

PATENT NO.  :  5,403,485
DATED       :  April 4, 1995
INVENTOR(S) :  Gustav DUNWEG et al.

It is certified that error appears in the above-identified patent and that said Letters Patent is hereby corrected as shown below:

On the cover page, in Section [75], please change "Lother" to --Lothar--.

Signed and Sealed this

Thirtieth Day of May, 1995

Attest:

BRUCE LEHMAN

Attesting Officer       Commissioner of Patents and Trademarks